US009178768B2

(12) United States Patent
Adam et al.

(10) Patent No.: US 9,178,768 B2
(45) Date of Patent: Nov. 3, 2015

(54) METHODS, SYSTEMS, AND COMPUTER READABLE MEDIA FOR COMBINING VOICE OVER INTERNET PROTOCOL (VOIP) CALL DATA WITH GEOGRAPHICAL INFORMATION

(75) Inventors: Richard Adam, Lancaster, CA (US);
Rex Hester, Bear Creek, NC (US);
Richard Van Schaik, Galena, OH (US);
Carl Mottayaw, Bellefontaine, OH (US)

(73) Assignee: Ixia, Calabasas, CA (US)

( * ) Notice: Subject to any disclaimer, the term of this patent is extended or adjusted under 35 U.S.C. 154(b) by 959 days.

(21) Appl. No.: 12/406,912

(22) Filed: Mar. 18, 2009

(65) Prior Publication Data

US 2010/0172251 A1    Jul. 8, 2010

Related U.S. Application Data

(60) Provisional application No. 61/143,047, filed on Jan. 7, 2009.

(51) Int. Cl.
| | |
|---|---|
| *H04L 12/24* | (2006.01) |
| *H04M 7/00* | (2006.01) |
| *H04W 4/02* | (2009.01) |

(Continued)

(52) U.S. Cl.
CPC ............ *H04L 41/12* (2013.01); *H04L 41/5009* (2013.01); *H04L 41/5087* (2013.01); *H04L 67/18* (2013.01); *H04L 67/36* (2013.01); *H04M 7/0084* (2013.01); *H04W 4/02* (2013.01); *H04L 12/2697* (2013.01); *H04L 41/069* (2013.01); *H04L 41/5032* (2013.01); *H04L 43/50* (2013.01); *H04L 65/80* (2013.01)

(58) Field of Classification Search
None
See application file for complete search history.

(56) References Cited

U.S. PATENT DOCUMENTS 7,277,637 B2 * 10/2007 Jette et al. ....................... 398/70
7,295,119 B2 * 11/2007 Rappaport et al. ......... 340/572.4
(Continued)

FOREIGN PATENT DOCUMENTS

| JP | 2005-129981 A | 5/2005 |
|---|---|---|
| KR | 10-2008-0073006 A | 8/2008 |

(Continued)

OTHER PUBLICATIONS

Notice of Allowance and Fee(s) Due for U.S. Appl. No. 12/395,657 (Aug. 17, 2011).

(Continued)

*Primary Examiner* — Gregory Sefcheck
(74) *Attorney, Agent, or Firm* — Jenkins, Wilson, Taylor & Hunt, P.A.

(57) ABSTRACT

Methods, systems, and computer readable media for combining VoIP call data with geographical information are disclosed. According to one method, VoIP subscriber device call quality information and VoIP subscriber device status information are determined for a plurality of VoIP subscriber devices. Geographic information is obtained regarding a geographic area in which the VoIP subscriber devices are deployed. The VoIP subscriber device status and the call quality information are combined with the geographic information and, based on the combined VoIP subscriber device status and the geographic information, a map that illustrates the geographic locations of the VoIP subscriber devices and an indication of the current status and the call quality of each VoIP subscriber device is graphically displayed on a display device associated with a computer.

24 Claims, 9 Drawing Sheets

(51) Int. Cl.
*H04L 29/08* (2006.01)
*H04L 12/26* (2006.01)
*H04L 29/06* (2006.01)

(56) References Cited

U.S. PATENT DOCUMENTS

| | | | |
|---|---|---|---|
| 7,352,705 B1 | 4/2008 | Adhikari et al. | |
| 7,454,140 B2* | 11/2008 | Jette et al. | 398/70 |
| 7,496,815 B2* | 2/2009 | Bhaumik et al. | 714/724 |
| 7,516,033 B2* | 4/2009 | Smith et al. | 702/90 |
| 7,660,409 B1* | 2/2010 | Czerwiec et al. | 379/413.02 |
| 7,706,264 B2* | 4/2010 | Lai et al. | 370/230 |
| 7,756,418 B2* | 7/2010 | Ofalt et al. | 398/25 |
| 7,773,511 B2* | 8/2010 | Rambo et al. | 370/230 |
| 7,773,982 B2* | 8/2010 | Bishop et al. | 455/420 |
| 7,808,247 B1* | 10/2010 | Lo | 324/533 |
| 7,835,293 B2* | 11/2010 | Cidon et al. | 370/248 |
| 7,849,177 B2* | 12/2010 | Uhlik | 709/223 |
| 7,933,518 B2* | 4/2011 | Li et al. | 398/22 |
| 7,940,676 B2* | 5/2011 | Griffin et al. | 370/242 |
| 7,965,195 B2* | 6/2011 | Deaver et al. | 340/660 |
| 8,073,943 B2* | 12/2011 | Monk et al. | 709/224 |
| 8,077,026 B2* | 12/2011 | Jobe et al. | 340/506 |
| 8,077,049 B2* | 12/2011 | Yaney et al. | 340/660 |
| 8,081,578 B2 | 12/2011 | Adam et al. | |
| 8,122,427 B2* | 2/2012 | Chrysanthakopoulos et al. | 717/104 |
| 8,145,447 B2* | 3/2012 | Zellner et al. | 702/122 |
| 8,156,098 B1* | 4/2012 | Landsman et al. | 707/706 |
| 8,165,572 B1* | 4/2012 | Kirchhoff et al. | 455/417 |
| 8,189,468 B2* | 5/2012 | Bugenhagen | 370/230.1 |
| 8,280,978 B2* | 10/2012 | Ansari et al. | 709/217 |
| 8,316,005 B2* | 11/2012 | Moore | 707/707 |
| 8,363,557 B2* | 1/2013 | Adam et al. | 370/249 |
| 8,369,326 B2* | 2/2013 | Ansari et al. | 370/389 |
| 8,515,015 B2* | 8/2013 | Maffre et al. | 379/10.01 |
| 8,700,738 B2* | 4/2014 | Moore et al. | 709/219 |
| 2002/0145979 A1 | 10/2002 | Baj | |
| 2003/0093513 A1 | 5/2003 | Jeffrey et al. | |
| 2004/0151127 A1* | 8/2004 | Chong | 370/252 |
| 2006/0114920 A1 | 6/2006 | Jung et al. | |
| 2007/0011145 A1* | 1/2007 | Snyder | 707/3 |
| 2007/0011725 A1 | 1/2007 | Sahay et al. | |
| 2007/0147354 A1 | 6/2007 | He | |
| 2007/0177615 A1* | 8/2007 | Miliefsky | 370/401 |
| 2007/0223512 A1* | 9/2007 | Cooper et al. | 370/437 |
| 2008/0002675 A1* | 1/2008 | Li et al. | 370/353 |
| 2008/0031425 A1 | 2/2008 | Glynn et al. | |
| 2008/0102809 A1 | 5/2008 | Beyer | |
| 2008/0136607 A1* | 6/2008 | Ratcliff et al. | 340/310.11 |
| 2008/0184260 A1* | 7/2008 | Grayson | 719/313 |
| 2008/0195461 A1* | 8/2008 | Li et al. | 705/10 |
| 2009/0046636 A1* | 2/2009 | Kwak | 370/328 |
| 2009/0060495 A1 | 3/2009 | Wurst et al. | |
| 2009/0129557 A1* | 5/2009 | Carter et al. | 379/22.01 |
| 2009/0243517 A1 | 10/2009 | Verfuerth et al. | |
| 2009/0245118 A1* | 10/2009 | McCormick | 370/252 |
| 2009/0268713 A1* | 10/2009 | Ottur et al. | 370/352 |
| 2009/0290513 A1* | 11/2009 | Swan | 370/255 |
| 2010/0071053 A1* | 3/2010 | Ansari et al. | 726/12 |
| 2010/0172246 A1 | 7/2010 | Adam et al. | |
| 2010/0266106 A1 | 10/2010 | Adam et al. | |

FOREIGN PATENT DOCUMENTS

| | | |
|---|---|---|
| WO | WO 2010/080926 A1 | 7/2010 |
| WO | WO 2010/080930 A2 | 7/2010 |

OTHER PUBLICATIONS

Official Action for U.S. Appl. No. 12/475,451 (Apr. 15, 2011).
Official Action for U.S. Appl. No. 13/395,657 (Apr. 14, 2011).
Notification of Transmittal of the International Search Report and the Written Opinion of the International Searching Authority, or the Declaration for International Application No. PCT/US2010/020394 (Aug. 16, 2010).
Notification of Transmittal of the International Search Report and the Written Opinion of the International Searching Authority, or the Declaration for International Application No. PCT/US2010/020390 (Aug. 13, 2010).
Notification of Transmittal of the International Search Report and the Written Opinion of the International Searching Authority, or the Declaration for International Application No. PCT/US2010/020391 (Aug. 13, 2010).
Commonly-assigned, co-pending U.S. Appl. No. 12/475,451, filed May 29, 2009.
"Series P: Telephone Transmission Quality, Telephone Installations, Local Line Networks; Methods for Objective and Subjective Assessment of Quality; Perceptual Evaluation of Speech Quality (PESQ): An Objective Method for End-to-End Speech Quality Assessment of Narrow-Band Telephone Networks and Speech Codecs," ITU-T P3862 (Feb. 2001).
Notice of Allowance and Fee(s) Due for U.S. Appl. No. 12/475,451 (Jun. 8, 2012).
Official Action for U.S. Appl. No. 12/475,451 (Nov. 23, 2011).
Notice of Allowance and Fee(s) Due for U.S. Appl. No. 12/475,451 (Oct. 4, 2012).

* cited by examiner

FIG. 2A

| Tel. No. | Parent | Jitter (ms) Uplink | Jitter (ms) Downlink | Latency (ms) Uplink | Latency (ms) Downlink | Packet Loss % Uplink | Packet Loss % Downlink | Total Calls | Total QoS Concern Calls |
|---|---|---|---|---|---|---|---|---|---|
| 9736322811 | BUNN-637 | 6 | 7 | 15 | 18 | 0.30 | 0.31 | 19 | 12 |

FIG. 2B

| Called Tel. No. | Calling Tel. No. | Start Time | End Time | Duration (sec) | Jitter (ms) Uplink | Jitter (ms) Downlink | Latency (ms) Uplink | Latency (ms) Downlink | Packet Loss % Uplink | Packet Loss % Downlink |
|---|---|---|---|---|---|---|---|---|---|---|
| 9736322811 | 9735901000 | 11/26/2008 16:04:41 | 11/26/2008 16:04:59 | 18 | 5 | 6 | 14 | 17 | 0.29 | 0.30 |
| 9736322811 | 9735901000 | 11/25/2008 16:04:41 | 11/25/2008 16:04:59 | 18 | 7 | 8 | 16 | 19 | 0.31 | 0.32 |

FIG. 2C

| Tel. No. | Average PESQ | Expected PESQ | No. PESQ Calls | No. PESQ Failures |
|---|---|---|---|---|
| 9736322811 | 2.872 | 3.500 | 201 | 201 |

| Tel. No. | IP Address | House | Street | City | State | Country | Longitude | Latitude | Altitude | CAD available? |
|---|---|---|---|---|---|---|---|---|---|---|
| 9736322811 | 207.59.234.210 | 1202 | Sunset Drive | Butler | NJ | USA | 74° 21'15" W | 40° 59'37" N | N/A | N |

300 302 304 306 308 310 312 314 316 318 320

FIG. 3

METHODS, SYSTEMS, AND COMPUTER READABLE MEDIA FOR COMBINING VOICE OVER INTERNET PROTOCOL (VOIP) CALL DATA WITH GEOGRAPHICAL INFORMATION

PRIORITY CLAIM

This application claims the benefit of U.S. Provisional Patent Application Ser. No. 61/143,047, filed Jan. 7, 2009; the disclosure of which is incorporated herein by reference in its entirety.

TECHNICAL FIELD

The subject matter described herein relates to VoIP device information. More specifically, the subject matter relates to methods, systems, and computer readable media for combining VoIP call data with geographical information.

BACKGROUND

Voice over Internet protocol (VoIP) implementations enable voice traffic, such as telephone calls, to be carried over Internet protocol (IP) communications networks. This allows voice calls to leverage the reduced transmission cost of packet switched networks to carry information that was once exclusively carried over more expensive conventional circuit switched networks. During a VoIP call, the voice signal of a VoIP call is compressed and packetized using one or more protocols so as to be suitable for transmission over a packet switched communications network (e.g., the Internet) to the called party. When VoIP packets are received at their destination, the voice signal is decompressed before being played to the called party. The specific path that the packets take over a packet switched communications network varies and, therefore, a VoIP call between the same origin and destination may take different paths through the communications network. As a result, voice call quality for VoIP calls may vary more than for conventional calls transmitted over a circuit switched network. Exemplary factors that may affect VoIP call quality may include packet delay, jitter, and loss. The importance of maintaining consistently high call quality for VoIP calls is especially important because service providers may enter into contracts with customers to provide specified levels of speech quality between specified endpoints.

In order to better evaluate VoIP call quality, various measures of speech quality have been used for monitoring speech quality for VoIP calls. These measures can be generally divided into objective and subjective measures of voice quality for ensuring that a specified voice quality level is being met. Objective measures of speech quality may include, for example, monitoring the number of packets being dropped compared to an acceptable threshold value. Objective measures of speech quality have the advantage of being fully computer-implementable, and therefore fully automatable and reliable. However, because speech quality is fundamentally a judgment perceived by human users rather than machines, many purely objective measures fail to correlate with subjective measures of speech quality. As a result, subjective measures of speech quality have also been developed. For example, one conventional subjective speech quality measure includes a mean opinion score (MOS) for a call. The MOS for a call may be determined by judging the voice quality of a call using a variety of human listeners, whose judgments may be expressed on a scale of 1 (bad) to 5 (excellent). While subjective measures may provide a more accurate indication of speech quality as perceived by a human user, they may nonetheless lack some of the advantages associated with objective speech quality measures described above.

More recently, an algorithm known as perceptual evaluation of speech quality (PESQ) has been developed which more accurately matches the perceived quality scores determined using subjective measures while still being based on objective measures. A primary reason for the success of PESQ as a call quality evaluation tool is that PESQ is capable of accounting for filtering, variable delay, and short localized distortions of packetized voice calls common to VoIP calls. As a result, PESQ is a popular measure of end-to-end voice quality over packet switched networks. Specifically, a PESQ score is an estimation of speech quality that is expressed on a scale of −0.51 (bad) to 4.5 (excellent) based on objective criteria such as packet delay, jitter, and loss. PESQ compares an original signal X(t) with a degraded signal Y(t) that is the result of passing X(t) through a communications system by placing one or more test calls to a subscriber device such as a cable or DSL modem. The output of PESQ is a prediction of the perceived quality that would be given to Y(t) in a subjective listening test. When PESQ or similar algorithms are used to measure speech quality, a dedicated voice call is set up to transmit only test speech signals over a communications network. This enables the test voice signals to be easily identified and provides a means of determining the amount of degradation that occurs as a result of transmission over the network. PESQ provides an estimate of the speech quality and is described in international telecommunications union (ITU) recommendation P.862, the content of which is incorporated herein by reference in its entirety. In addition to test call data, IP metrics may be maintained for calls placed by or received by subscribers. IP metrics may include objective values such as jitter, latency, and packet loss which may be obtained from one or more call detail records (CDRs).

In addition to VoIP data, service providers may maintain geographical information describing the physical location of network devices and endpoints within the network. For example, street addresses and global positioning system (GPS) coordinates for each switch, router, hub site, node, and/or modem may be maintained so that the physical location of every entity in the service provider's network is known.

However, one problem associated with conventional methods for monitoring voice quality in packet switched networks is that test call data and geographical information are separately maintained. As a result, physical relationships between test call errors and/or successes may be obscured from the service provider and, as such, operators may be slow to identify and correct network problems affecting VoIP call quality.

Accordingly, in light of these difficulties, a need exists for improved methods, systems, and computer readable media for combining VoIP call data with geographical information and displaying it to a user.

SUMMARY

Methods, systems, and computer readable media for combining VoIP call data with geographical information are disclosed. According to one method, VoIP subscriber device call quality information and VoIP subscriber device status information are determined for a plurality of VoIP subscriber devices. Geographic information is then obtained for a geographic area in which the VoIP subscriber devices are deployed. The VoIP subscriber device status, call quality, and geographic information are combined and, based on the combined VoIP subscriber device status, call quality, and geographic information, a map illustrating the geographic locations of the VoIP subscriber devices and an indication of the current status and the call quality of each VoIP subscriber device is graphically displayed on a display device associated with a computer.

A system for combining VoIP call data with geographical information is also disclosed. The system includes a VoIP data module for determining VoIP call quality and device status information for a plurality of VoIP subscriber devices. A geographic information module obtains geographic information regarding a geographic area in which the VoIP subscriber devices are deployed. A data combining and mapping module combines the VoIP subscriber device status and the call quality information with the geographic information and, based on the combined VoIP subscriber device status, call quality, and the geographic information, generates a map that illustrates the geographic locations of the VoIP subscriber devices and an indication of the current status and the call quality of each VoIP subscriber device. A display device associated with a computer then graphically displays the map.

The subject matter described herein for combining VoIP data with geographical information may be implemented using a computer readable medium comprising computer executable instructions that are executed by a computer processor. Exemplary computer readable media suitable for implementing the subject matter described herein includes disk memory devices, programmable logic devices, and application specific integrated circuits. In one implementation, the computer readable medium may include a memory accessible by a processor. The memory may include instructions executable by the processor for implementing any of the methods for combining VoIP call data with geographic information described herein. In addition, a computer readable medium that implements the subject matter described herein may be distributed across multiple physical devices and/or computing platforms.

BRIEF DESCRIPTION OF THE DRAWINGS

The subject matter described herein will now be explained with reference to the accompanying drawings of which:

FIG. 2A is an exemplary database entry including VoIP data for a network device suitable for combining with geographical information according to an embodiment of the subject matter described herein;

FIG. 2B is an exemplary database entry including geographical information for a network device suitable for combining with VoIP data according to an embodiment of the subject matter described herein;

FIG. 2C is an exemplary database entry including geographical information for a network device suitable for combining with VoIP data according to an embodiment of the subject matter described herein;

FIG. 3 is an exemplary database entry including geographical information for a network device suitable for combining with VoIP data according to an embodiment of the subject matter described herein;

DETAILED DESCRIPTION

Figure 1:
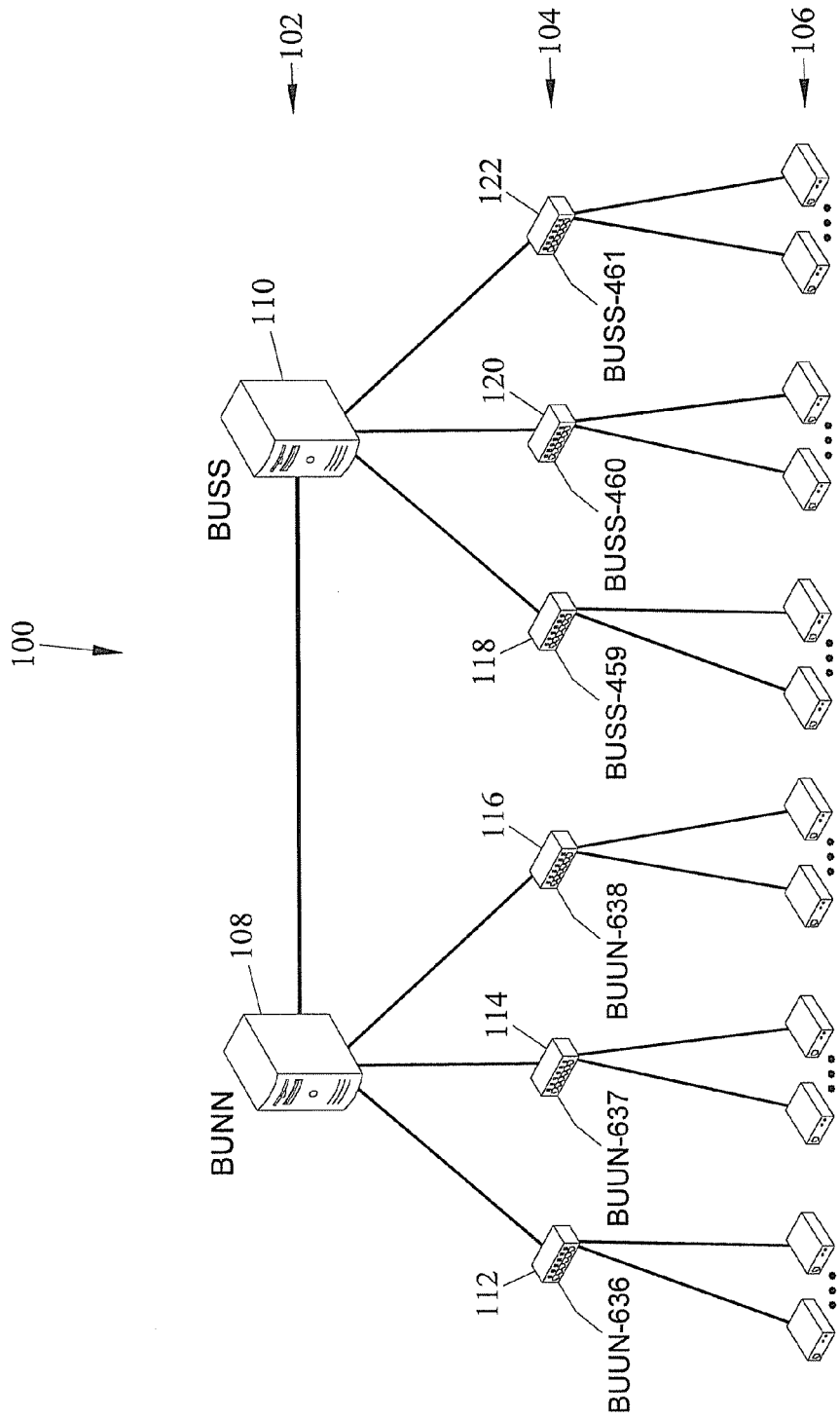
FIG. 1 is logical network diagram of an exemplary network suitable for combining with geographical information according to an embodiment of the subject matter described herein.

FIG. 1 is a logical network diagram of an exemplary network suitable for being combined with VoIP subscriber device status, call quality, and geographical information according to an embodiment of the subject matter described herein. Referring to FIG. 1, network 100 may include one or more network devices that are arranged into one or more hierarchical levels. Each logical hierarchical level may include multiple network devices (of the same or similar type) that communicate with one another through a device located in the same or a higher hierarchical level. For example, network 100 may be divided into three levels. Hierarchical level 102 may include one or more network devices for aggregating VoIP traffic from lower levels and connecting segments of network 100. Hierarchical level 104 may include one or more network devices that are lower than level 102. Because level 104 is lower in the hierarchy than level 102, devices in level 104 may carry less traffic than devices located in level 102. However, level 104 may perform a similar traffic aggregation function for devices belonging to lower hierarchical levels. At the lowest level of the logical network hierarchy shown in FIG. 1, a plurality of VoIP subscriber devices may comprise hierarchical level 106.

Returning to hierarchical level 102, device 108 (e.g., "BUNN") and device 110 (e.g., "BUSS") may be connected together and to devices located in hierarchical level 104. Devices 108 and 110 may each be associated with a plurality of devices belonging to hierarchical level 104. As will be illustrated below, devices 108 and 110 may also be geographically separated in order to serve a large physical area in which subscribers or devices may be located. In network 100, devices 108 is logically associated with a first group of devices 110 is associated with a second group of devices. As shown in FIG. 1, no overlap exists between devices in connected to devices 108 and devices connected to devices 110. However, it is appreciated that other embodiments in which multiple, alternate, and/or redundant communications links between devices may be used without departing from the scope of the subject matter described herein.

At hierarchical level 104, devices 108 may be logically associated with devices 112, 114, and 116, which may be identified as BUNN-636, BUNN-637, and BUNN-638, respectively. Likewise, device 110 may be logically associated with devices 118, 120, and 122, which may be identified as BUSS-459, BUSS-460, and BUSS-461, respectively. Typically, devices within a grouping associated with a particular device (e.g., devices 112-116 connected to device 108) are located in physical proximity to the device and each other. While this relationship is not shown in the logical network view depicted in FIG. 1, it will apparent in the geographical maps shown below.

At hierarchical level 106, a plurality of subscriber endpoints (also, "VoIP subscriber devices" or "subscribers") may include any suitable destination network terminal device that interfaces between the subscriber's network/computer and the service provider's network. Typically, a subscriber endpoint is a modem, such as a cable modem or multimedia terminal adapter (MTA), asynchronous digital subscriber link (ADSL) modem, synchronous digital subscriber link (SDSL) modem, fiber optic modem, optical network terminal (ONT), analog telephony adapter (ATA), SoftPhone, IP private branch exchange (PBX), wireless or wireline phone incorporating an ATA or MTA, VoIP mobile phone, or wireless modem (e.g., WiFi, WiMAX, GSM, etc.), however other types of subscriber endpoints may be used without departing from the scope of the subject matter described herein.

FIGS. 2A, 2B, and 2C are exemplary database entries of VoIP call data associated with a subscriber suitable for being combined with geographical information according to the subject matter described herein. Specifically, FIG. 2A is a database entry containing cumulative IP metrics for calls placed or received by a subscriber. FIG. 2B represents individual call statistics for providing a more detailed view of the average IP metrics shown in FIG. 2A. FIG. 2C represents VoIP test call data for the subscriber. In contrast to the IP metrics shown in FIGS. 2A and 2B, VoIP test call data is not the result of calls placed or received by the subscriber, but rather may be generated by placing one or more test calls to the subscriber's device (e.g., loopback).

In FIG. 2A, column 200 may include a telephone number associated with the subscriber, such as 973-632-2811. The subscriber device may be connected to a network device, such as a hub, switch, or router that aggregates the traffic for multiple subscriber connections and routes the traffic into the core network. In this example, subscriber 200 is associated with network device BUNN-637 listed in column 202. Based on one or more calls made or received by subscriber 200, objective call statistics which may be indicative of call quality may be determined. Exemplary call statistics may include jitter, latency, and packet loss, total number of calls, and a number of calls having low a QoS. IP metrics shown in FIG. 2A may be obtained, for example, from call detail records (CDRs) for the subscriber. Thus, referring to the example shown in FIG. 2A, for a given statistics monitoring period, subscriber 200 is associated with an average uplink jitter of 6 ms (column 204), average downlink jitter of 7 ms (column 206), average uplink latency of 15 ms (column 208), average downlink latency of 18 ms (column 210, average packet loss of 0.30 percent (column 212), and an average downlink packet loss of 0.31 percent (column 214). The call statistics listed in columns 204-214 are collected from multiple calls. The total number of calls placed or received by subscriber 200 is shown in column 216. Of the 19 calls listed in column 216, 12 calls are associated with IP metrics indicating a low quality of service (QoS) level. This number is listed in column 218.

In FIG. 2B, individual call statistics are shown. For example, column 220 indicates that subscriber 200 received two calls, both of which were from calling party number 973-590-1000, as shown in column 222. Columns 224 and 226 include the start time and end time for each call, respectively. The first of the two calls shown in FIG. 2B was initiated at 4:04 pm on Nov. 26, 2008 and ended 18 second later. The second of the two calls shown in FIG. 2B was initiated at the same time on the previous day, Nov. 25, 2008. Thus, the duration of each call was 18 seconds, as indicated by column 228. In columns 228-240, individual call statistics are listed including uplink jitter (column 230), downlink jitter (column 232), uplink latency (column 234), downlink latency (column 236), packet loss (column 238), and downlink packet loss (column 240). It is appreciated that the average of the two calls shown equals the average values listed in columns 204-214 for subscriber 200.

In FIG. 2C, a number of test calls were placed to telephone number 973-632-2811 (column 242). Unlike calls made or received by a subscriber where a conversation between people occurs, test calls do not ring the subscriber's device and therefore are simply a connection between two network devices for the purpose of gathering call quality statistics. For example, a loopback test is a method used to describe routing electronic signals from an originating facility quickly back to the same source entity without intentional processing or modification. Loopbacks are primarily used for testing a communications network transmission infrastructure. As used herein, a loopback, short loop, or loop-back procedure, refers to a hardware or software method that feeds a received signal or data back to the sender. A loopback test may be performed within a modem by connecting its output to its own input. Alternatively, a loopback test may be used to test a connection between two points in different locations by sending a test signal from one location and having the network device at a second location automatically send the signal back to the sender.

In one embodiment, VoIP call quality can be measured using information obtained from one or more test calls that is used to calculate a PESQ score. For example, a PESQ score is an estimate of speech quality that is expressed on a scale of 1 (bad) to 5 (excellent) based on objective criteria such as packet delay, jitter, and loss. For a particular type of call, location, etc., an acceptable and/or expected PESQ score may be determined. After a test call has been placed to the subscriber in order to obtain an actual PESQ score, the actual PESQ score may be compared to the expected value in order to determine whether the QoS needs to be addressed by the network operator. FIG. 2C shows a poor PESQ score for subscriber 242. Specifically, the average observed PESQ score was 2.872, as shown in column 244, while the expected PESQ score was 3.500. Additionally, out of 201 total PESQ test calls placed to the subscriber (column 248), all 201 PESQ test calls experienced PESQ score failures (column 250). It may be appreciated that the percentage of PESQ call failures to the total number of PESQ calls shown in FIG. 2C may be different than the percentage of low QoS calls to total calls shown in FIG. 2A. For example, the percentage of PESQ call failures listed in columns 248-250 is 100%, while the percentage of low QoS calls listed in columns 216-218 is approximately 63%.

FIG. 3 is an exemplary database entry including geographical information suitable for combining with VoIP data according to an embodiment of the subject matter described herein. Referring to FIG. 3, column 300 may include a telephone number for a subscriber device. In the embodiments used herein, subscriber device includes a VoIP device and may therefore be associated with an IP address. For example, the subscriber associated with telephone number 973-632-2811 may be associated with IP address 207.59.234.210, as indicated by column 302. Once a subscriber device is determined based on either its telephone number 300 or IP address 302, geographical information indicating the physical location of the device may be listed in the remaining columns.

Specifically, in the embodiment shown in FIG. 3, the subscriber device may be associated with three categories of geographical information. A first category of geographical information may include a conventional postal address, which may be used to determine the location of the subscriber. For example, subscriber 300 may be located at 1202 Sunset Drive, Butler N.J., USA, as shown in columns 304, 306, 308, 310, and 312, respectively. A second category of geographical information may include global positioning system (GPS) coordinates or similar information. Rather than locating the subscriber in relation to a man-made structure (i.e., postal address), GPS coordinates may identify the location of a subscriber by describing its position on Earth. For example, columns 314, 316, and 318 may identify the longitude, latitude, and altitude (if applicable) of the subscriber, respectively. Although various forms of coordinate notation exist, the notation used in FIG. 3 includes traditional units of degrees, minutes, and second of arc. Additionally, the longitudes and latitudes stored in columns 314 and 316 include whether the value is north or south of the Equator and east or west of the prime meridian, respectively. Thus, according to column 314, Butler, N.J. is located at 74 degrees, 21 minutes, and 15 seconds west of the prime meridian and according to column 316, Butler, N.J. is located at 40 degrees, 59 minutes, and 37 seconds north of the Equator. Because the information included in columns 314 and 316 are assumed to define a unique position on Earth, no altitude information is included in column 318. However, in other embodiments, it may be appreciated that multiple subscribers may be located at the same longitude and latitude (e.g., a multi-story dwelling), and may only be differentiated based on altitude. A third category of geographical information may include computer aided design (CAD) drawings for showing the physical plant information provided by the network operator. A CAD map can show physical locations of poles, cable strand, cable reels used to build the plant, spice/connector and tap locations of the coax, locations of power supplies, locations of amplifiers, locations of hub and node sites, optical distribution network and where fiber is used. However, in the example shown in column 320, no CAD map was available for the location.

Figure 4:
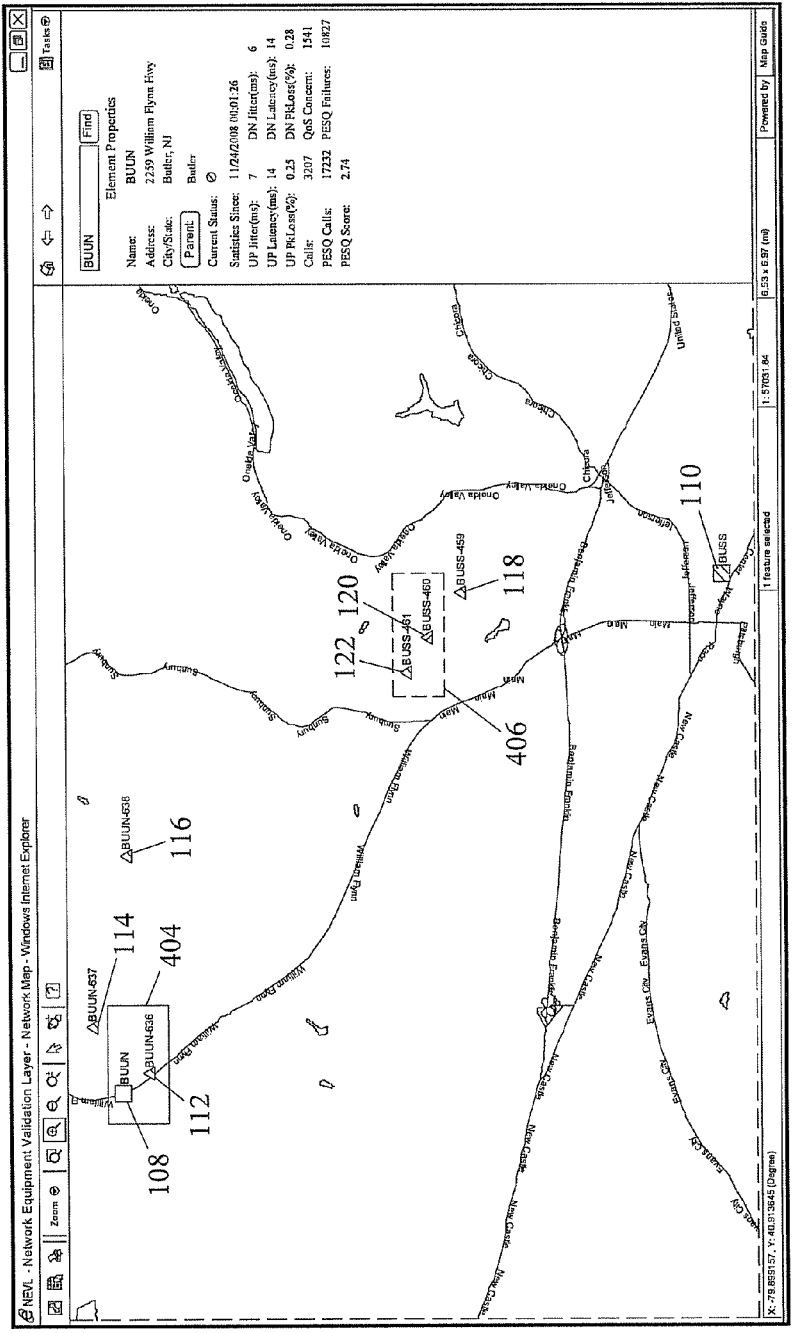
FIG. 4 is an exemplary computer screen display showing a combination of VoIP data and geographical information being simultaneously displayed on a map according to an embodiment of the subject matter described herein.

FIG. 4 is an exemplary computer screen display showing a combination of VoIP call data and geographical information simultaneously displayed on a map according to an embodiment of the subject matter described herein. Such a display may be displayed on a display device associated with a computer. Referring to FIG. 4, map view 400 illustrates an overlaid view of VoIP test data and geographical information. Viewing different types of geographic information (e.g., satellite images, buildings, roads, topology, etc.) may be enabled or disabled by the user via, for example, a graphical user interface (GUI). It is appreciated that additional types of geographical information may also be included in map view 400 without departing from the scope of the subject matter described herein. For simplicity of illustration, only major roads are shown in map view 400. The geographic area encompassed by map view 400 includes an area near Butler, N.J. and the geographic information shown includes major roads and bodies of water.

Zooming of map view 400 may allow a user to selectively view a subset of network devices based on their level within the logical network hierarchy in addition to limiting the scope of the geographic area viewed. For example, map view 400 shows network devices belonging to hierarchical levels 102 and 104. In the northwest region of map view 400, device 108 is shown in proximity to devices 112-116. In the southeast region of map view 400, device 110 is shown in proximity to devices 114-118. A specific shape or icon may be used to distinguish between entities belonging to differently hierarchical level. For example, hub sites may be identified by squares, nodes may be identified by triangles, and subscriber endpoints may be identified by circles. Because each hierarchical level may be identified by a different shaped icon and each network device status may be indicated by a different color, a network operator may easily appreciate the geographic and logical relationships between the network devices and their statuses using map view 400.

Additionally, a user may select a particular network device within map view 400 for viewing more detailed VoIP call quality information in data window 402. Detailed VoIP call quality information displayed in data window 402 may include a street address, parent identifier, jitter, latency, packet loss, and/or PESQ scores associated with a subscriber or network device. VoIP call quality information may be displayed as averages calculated over a configurable time period or may be displayed as individual statistics for each call in a history of calls made or received by the subscriber. Device 108 may be selected simply by clicking on its icon in map view 400. In exemplary data view 402, it is appreciated that device 108 has been selected and its geographic information automatically retrieved from one or more geographic information database entries and used to indicate that device 108 is located at 2259 William Flynn Highway.

As described above, exemplary call statistics may include jitter, latency, and packet loss, total number of calls placed (to or from the device), the number of calls having a low QoS score, total number of PESQ calls, total number of PESQ call failures, and an average PESQ score for PESQ calls. In the example shown in FIG. 4, device 108 has a PESQ score of 2.74, which may indicate a below-average (i.e., concerning) QoS level to the network operator. Thus, device 108 may be shaded red indicating a concerned PESQ score status. Using the map zoom feature, an operator may select a portion of map view 400 in order to view network devices belonging to lower hierarchical network levels or network areas. In the example shown in FIG. 5A, the status of individual subscribers may be viewed by zooming in on area 404, which includes devices 108 and 112.

Figure 5A:
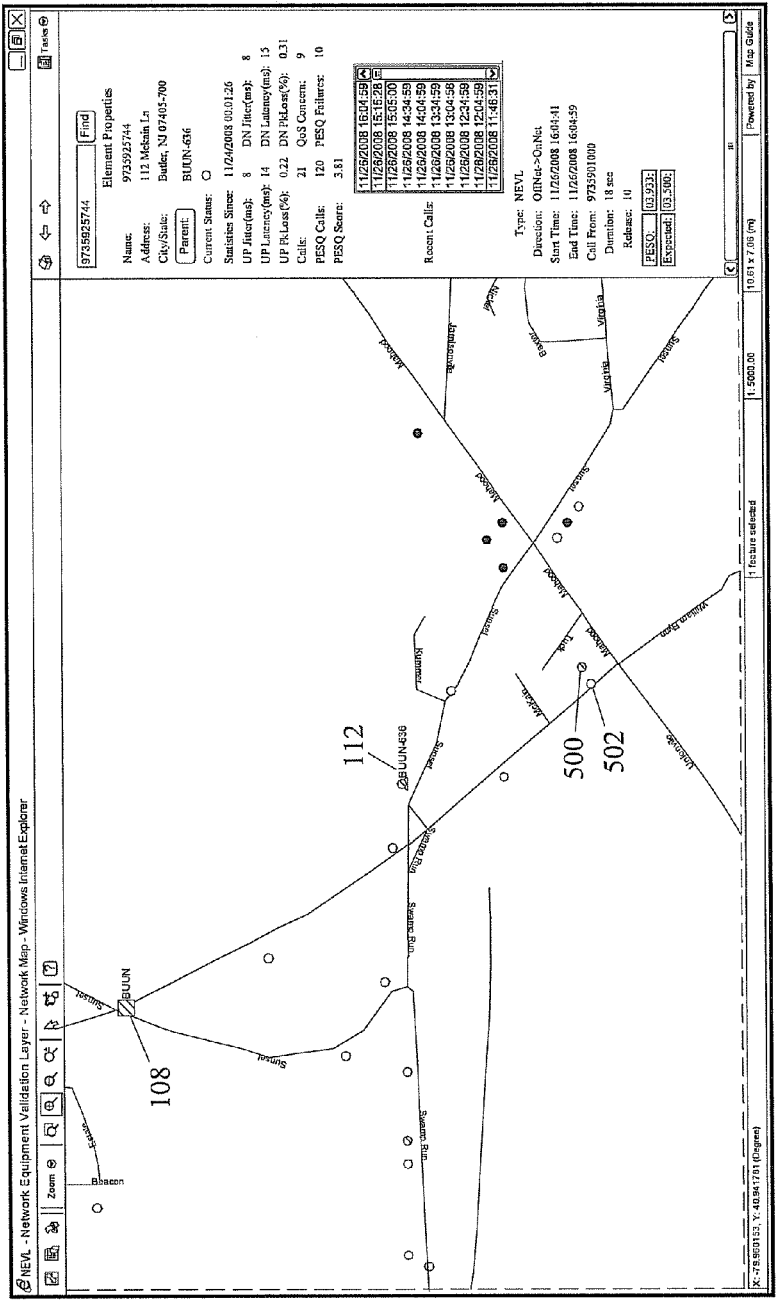
FIG. 5A is an exemplary computer screen display showing VoIP data indicating a good PESQ score being combined with geographical information and simultaneously displayed on a map according to an embodiment of the subject matter described herein.

FIG. 5A is an exemplary computer screen display showing VoIP data indicating a good PESQ score being combined with geographical information and simultaneously displayed on a map according to an embodiment of the subject matter described herein. As mentioned above, at each hierarchical level, different colors may be used to distinguish between different subscriber statuses. According to one embodiment, the color green may be used to indicate a normal status, yellow to indicate a concern status, and red to indicate an error or failure. For subscriber endpoints, a green icon may indicate a normal status, a yellow icon may indicate poor IP metrics (e.g., obtained via CDR examination) and a red icon may indicate a test call with low PESQ score. One advantage of using different colors and/or symbols to indicate different types of network devices and/or call quality statuses may include providing a visual indication of where both good and poor quality calls are occurring, both historically and in real-time. These visual indications may be graphically displayed in a geographical representation or map of an area for providing a network operator or other user with an accurate picture of the health of a network at a glance. According to one aspect, the devices shown in the map viewer may be customized based on one or more variables. For example, threshold values may be configured for up-/down-stream latency, jitter, packet loss, and an acceptable threshold percentage of call failures. These variables may further be limited to a particular time period, such as limiting call statistics to the most recent week of QoS records. In this way, an operator may easily identify devices of interest for particular metrics on a map and, thus, may identify problem areas within the network.

Map view 404 shows a plurality of subscribers connected to BUNN-636 112. As indicated by its icon color, subscriber 500 is associated with a call quality status red corresponding to a poor PESQ score based on PESQ test call data. In contrast, subscriber 502 is located in close physical proximity to subscriber 500 and is associated with call quality status green/normal corresponding to an acceptable PESQ score. Thus, a network operator viewing map view 404 may investigate what possible differences between subscribers 500 and 502 may account for the observed differences in VoIP call quality. For example, subscribers 500 and 502 may use different brands of modems, be connected to a main communications link via different taps, etc. By displaying both VoIP data and geographical information in a combined view, a network operator may more readily appreciate potential problems and solutions to improving VoIP call quality.

Additionally, from map view 404, a network operator may display individual call data for selected network devices or subscribers. For example, a list of most recent calls may be displayed with individually color coded calls. By selecting a particular call within the recent call list, VoIP test call data or IP metrics may be displayed in the data view portion of the screen display.

Figure 5B:
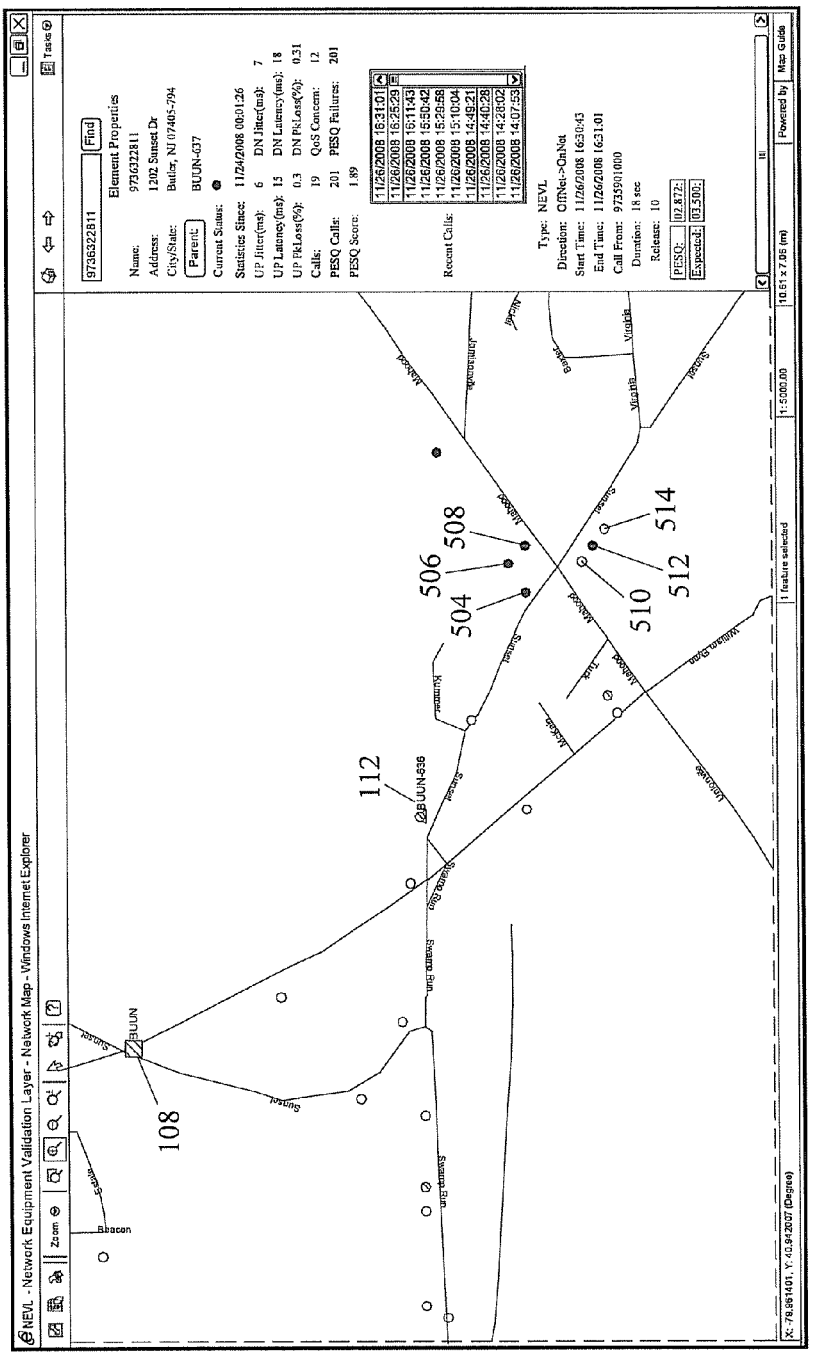
FIG. 5B is an exemplary computer screen display showing VoIP data indicating a bad PESQ score being combined with geographical information and simultaneously displayed on a map according to an embodiment of the subject matter described herein.

FIG. 5B is an exemplary computer screen display showing VoIP data indicating a PESQ call failure combined with geographical information and simultaneously displayed on a map according to an embodiment of the subject matter described herein. Referring to FIG. 5B, a cluster of PESQ failures may be seen by a network operator when test call data is combined with geographical data and viewed on a map. For example, subscribers 504, 506, and 508 all have PESQ call failures, as indicated by their red (also, black) icons. Because subscribers 504, 506, and 508 are located in close physical proximity, it may be likely that the cause of the PESQ failures is related to a network component shared by subscribers 504-508. If subscribers 504-508 are located within the same physical structure (e.g., townhouse, apartment building, etc.) or share a common access point (i.e., tap) to the nearest network connection, then the operator may wish to send a technician to investigate these locations in order to address the PESQ failures for those subscribers. However, if a PESQ failure is not surrounded by other PESQ failures (i.e., is in proximity to normally operating subscribers), then it is likely that the problem lies with a network component specific to that particular subscriber.

An example of a PESQ failure that is surrounded by subscribers having normal statuses is also shown in FIG. 5B. Subscribers 510, 512, and 514 are also located in close physical proximity, such as neighbors on the same street. However, while subscriber 512 has experienced one or more PESQ failures, his neighboring subscribers 510 and 514 have not. Thus, a network operator may easily determine that the VoIP call quality problems affecting subscriber 512 are not likely to be associated with device 112 or 108 which all three subscribers 510-514 share. Instead, something specific to subscriber 512 should be investigated as the most likely cause.

Figure 6:
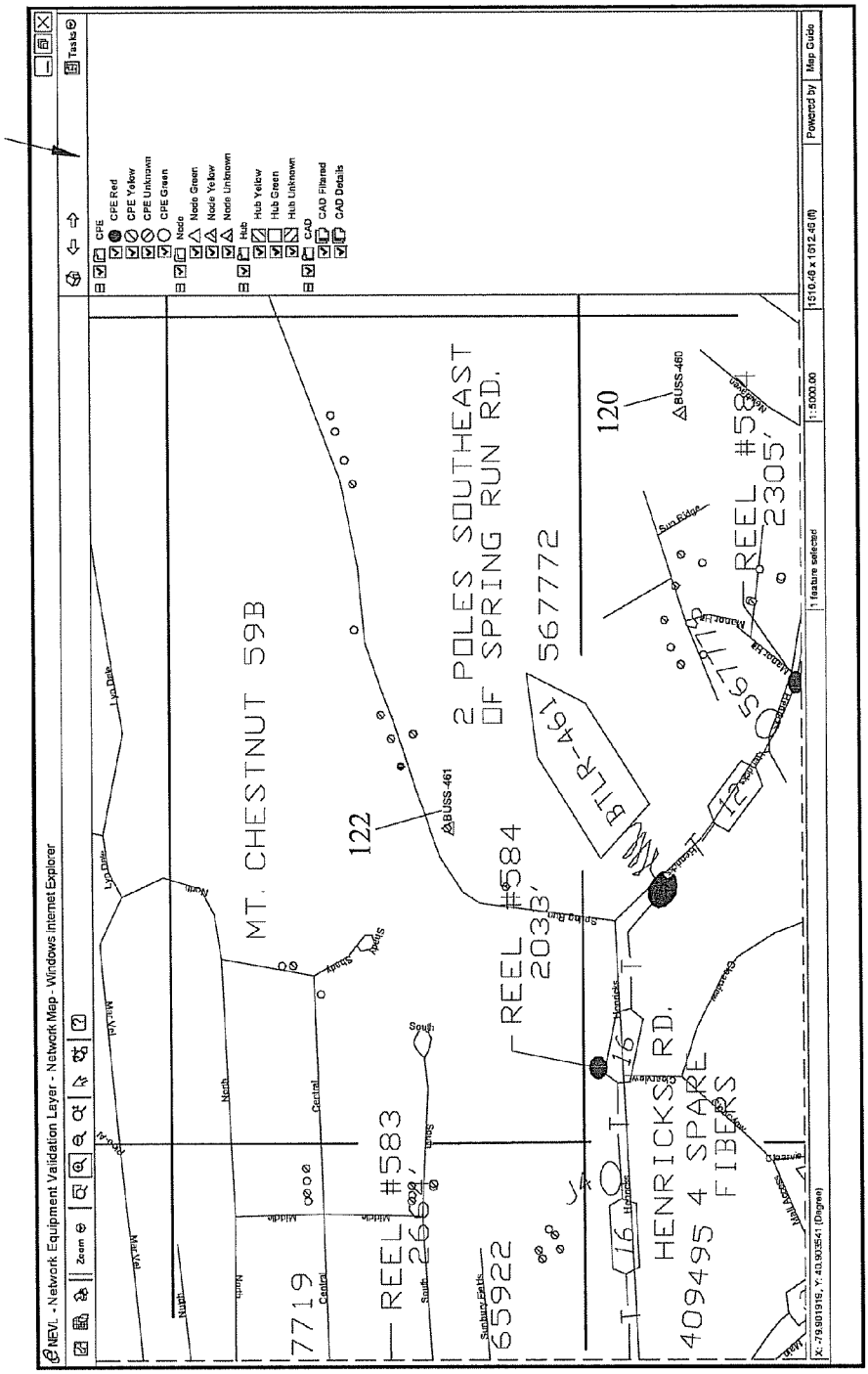
FIG. 6 is an exemplary computer screen display showing CAD map information overlaid onto a display showing a combination of VoIP data and geographical information according to an embodiment of the subject matter described herein.

FIG. 6 is an exemplary computer screen display showing CAD map information overlaid onto a display showing a combination of VoIP data and geographical information according to an embodiment of the subject matter described herein. Referring to FIG. 6, map view 406 is a zoomed in view of a portion of the area shown in map view 400 in FIG. 4.

According to map view 406, additional information may be enabled for viewing in order to better identify potential causes of network problems that affect VoIP call quality. For example, physical plant information may be provided in CAD maps provided by the network operator. A CAD map can show physical location of poles, cable strand, cable reels used to build the plant, spice/connector and tap locations of the coax, location of power supplies, location of amplifiers, location of hubs and nodes, optical cabling and distribution network devices such as optical line terminal (OLT) and optical network terminal (ONT) units. The information included in plant CAD maps is dependent on the CAD map details provided by the network operator. Information from CAD maps may be overlaid onto street and other subscriber information in map view 406. With the physical plant overlaid onto subscribers and streets, a user can see possible relationships between subscriber issues and the physical plant in the field. The task list 124 shown on the right side of FIG. 6 allows the user to filter by device type and status to look at only devices of concern.

Figure 7:
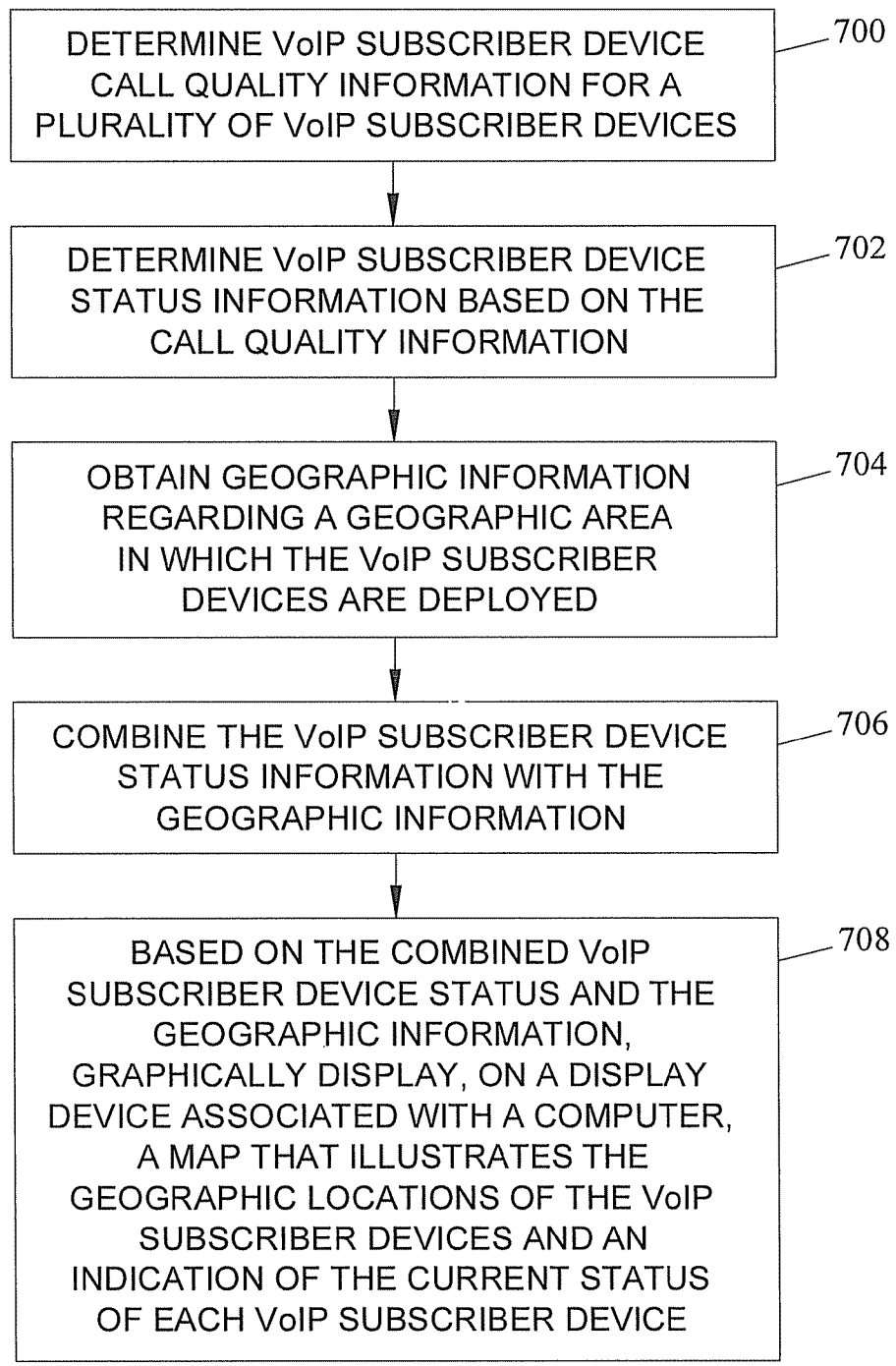
FIG. 7 is flow chart of exemplary steps for combining VoIP data with geographical information according to an embodiment of the subject matter described herein.

FIG. 7 is flow chart of exemplary steps for combining VoIP data with geographical information according to an embodiment of the subject matter described herein. Referring to FIG. 7, in block 700, VoIP subscriber device call quality information is determined for a plurality of VoIP subscriber devices. VoIP subscriber devices may be manually or automatically tested. For example, an operator may select a device for testing using the map view, and place a test call to that device. In addition to manually testing individual devices, an operator may manually test groups of devices. Device groups may be defined by having similar characteristics, such as communications mode (e.g., cable, DSL, etc.), geographic location, etc. For example, an operator may define an area to be tested, wherein devices located within the defined area may be tested collectively, simultaneously, sequentially, etc. The operator may additionally define a percentage of devices to be tested such that anywhere from 1-100% of the devices within the defined area are tested.

In one example of automatic testing, test lists may be used to define a testing schedule for a particular device based on characteristics of the device. For example, new subscribers may be placed in a new subscriber list and may be tested frequently in order to ensure high quality service. After a predetermined amount of time and/or number of acceptable quality calls, the subscriber may be transferred to a routine list where test calls are placed less often. A more complete description of using lists for automatically placing test calls is described in co-pending U.S. Provisional Patent Application (serial number not yet assigned), entitled, "Methods, Systems and Computer Readable Media for Categorizing Voice Over Internet Protocol (VoIP) Subscriber Numbers In Accordance with VoIP test and Call Quality Data," filed on even date herewith and the disclosure of which is incorporated herein by reference in its entirety.

In block 702, VoIP subscriber device status information is determined. For example, a color indication such as green, red, and yellow may be used to visually identify subscribers having made calls have out of preconfigured IP metrics limits. As described above, green may be used to indicate normal status (e.g., no active test call PESQ failures or poor IP metrics for observed calls), red may be used to indicate a subscriber having at least one PESQ failure, and yellow may indicate a subscriber having poor IP metrics for observed calls as determined by a CDR analysis.

In block 704, geographic information is obtained regarding a geographic area in which the VoIP subscriber devices are deployed. For example, street address or GPS coordinates for each VoIP subscriber device may be determined. Geographic information may be used to locate VoIP devices on a map to illustrate the physical relationship between devices which are not apparent from the logical relationships (e.g., IP addresses) included in VoIP data.

In block 706, VoIP subscriber device status information is combined with the geographic information. For example, the locations of network devices (e.g. hubs, nodes, and subscriber endpoints) may be associated with test call data. In one embodiment, database entries depicted in FIGS. 2A-2C may be combined with entries depicted in FIG. 3 to form a new database or may be linked using pointers, for example.

In block 708, based on the combined VoIP subscriber device status and the geographic information, a map illustrating the geographic locations of VoIP subscriber devices and an indication of the current status of each VoIP subscriber device is graphically displayed on a display device associated with a computer. For example, map 404 may display the geographic locations of multiple subscribers as well as each subscriber's status. In one embodiment, three colors may be used to differentiate between three different device statuses, namely, normal (green), concerned (yellow), and error/failure (red). Thus, an operator may, at a glance, see geographical clusters of subscribers experiencing call quality problems in order to better target technical support to those subscribers.

Figure 8:
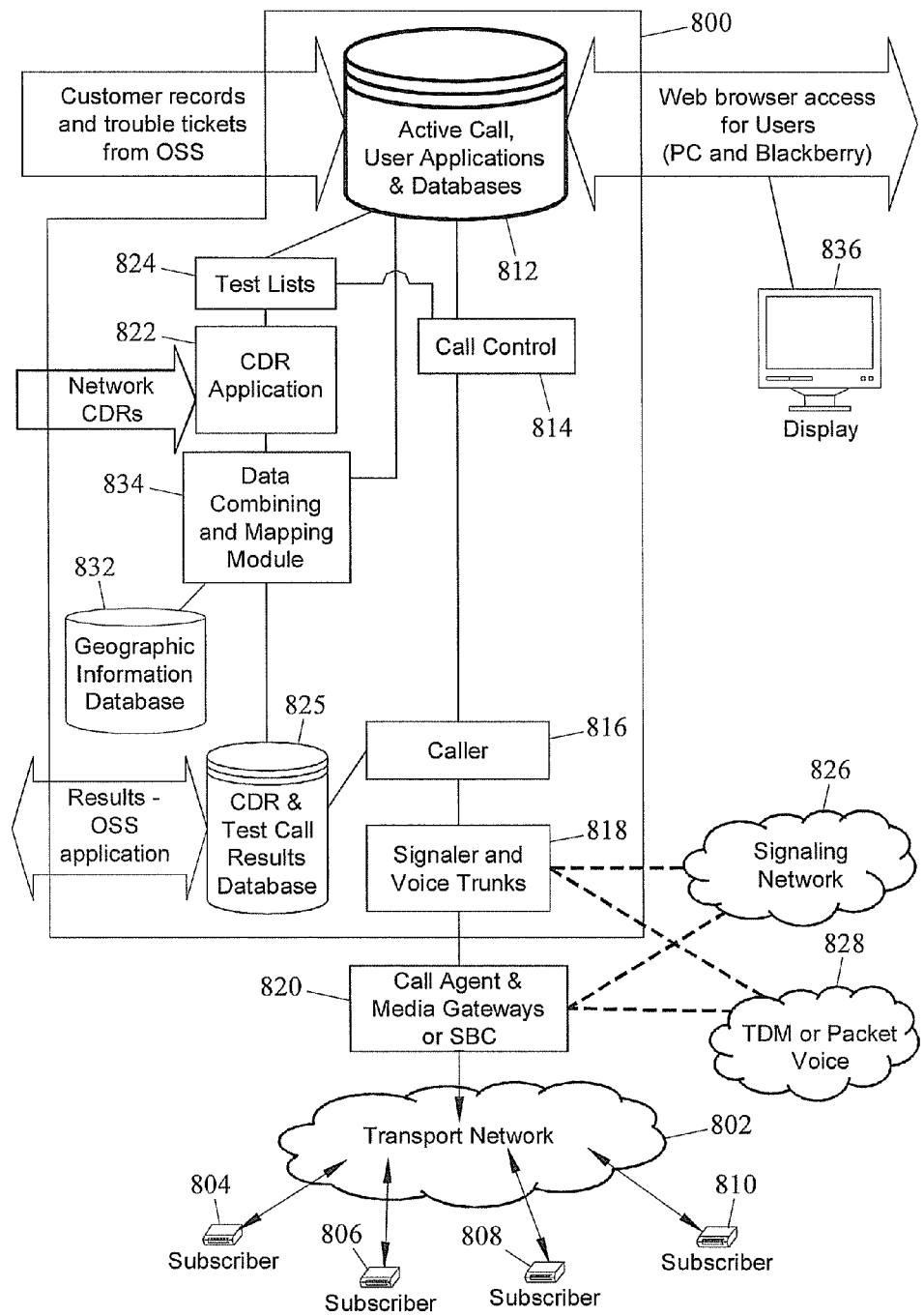
FIG. 8 is a block diagram of an exemplary system for combining VoIP data with geographical information according to an embodiment of the subject matter described herein.

FIG. 8 is a block diagram of an exemplary system for combining VoIP test data with geographical information according to an embodiment of the subject matter described herein. FIG. 8 depicts a telecommunications network that includes a test call system 800, transport network 802, and a plurality of subscriber endpoint devices 804-810. Test call system 800 may be used by a telecommunications service provider to generate and analyze test calls intended for testing VoIP call quality for subscriber endpoint devices 804-810. For example, test calls may be monitored by test call system 800 in order to detect poor voice path connections experienced by subscriber endpoint devices 804-810. In one embodiment, test call system 800 includes a system database 812, call control application 814, caller application 816, and signaler application 818. Test call system 800 may be communicatively coupled to a network operator interface (not shown), CDR and test call results database 825, a trouble ticket system (not shown), and one or more external applications (e.g., CDR application 822). The network operator interface may include a computing device, such as a personal computer or personal digital assistant, for executing an application (e.g., software application, web browser, etc.) that can be used for communicating with test call system 800. The trouble ticket system may include a customer trouble ticket system that is configured to collect trouble tickets. CDR application 822 will receive network CDRs from a network operator's application that includes call detail records for calls made to and from subscribers of the network. These CDRs will be analyzed for call quality and may then be used to provide test call data and/or instructions for automated test call generation to system 800. Test call and CDR results database 825 may include any form of database supported by a host computer that is responsible for storing call detail records (CDRs) and/or PESQ scores associated with test calls.

Within test call system 800, call control application 814 is responsible for initiating the test call process. According to one embodiment, call control application 814 may contain a plurality of test lists 824. Each test list may comprise a plurality of subscriber device numbers (each of which includes a bit field that identifies the list(s) the subscriber device number is assigned). Each test list may include parameters that set forth the frequency (i.e., the call rate) in which its listed subscriber device numbers are test called, the specific start and stop times of periods which the test calls are made, the type of test call(s) to be made, as well as the conditions for a subscriber device number to be added to, deleted from, or remain on a test list. Test lists 824 may be stored in the memory of call control application 814. Call control application 814 may also be responsible for ensuring that network resources are available for the request test calls (e.g., ensuring that a daily test call limit is not exceeded). Images of test lists 824 may also exist in system database 812 for backup or reboot purposes. In one embodiment, system database 812 stores the test list information which may be updated accordingly as changes occur in lists 824.

As previously discussed, test call system 800 may utilize test lists to conduct test calls. In one embodiment, test call system 800 initiates a test call to a subscriber device number via call control application 814. Specifically, call control application 814 may obtain test call requests, which include the subscriber device numbers from test lists 824. For each test list, call control application 814 is also configured to apply certain test list parameters, which are associated with each respective test list, to each test call directed to a subscriber device number during the test call initiation process. For example, the test list parameters for each test list may include the type of test call to generate (e.g., loopback or continuity test), the frequency in which test calls are to be made, the specific start and stop times for test calling, the minimum or maximum number of test calls that can be made during a given time period, and other calling criteria that is unique to a given test list. Call control application 814 is also responsible for analyzing the PESQ scores derived from the test calls as well as moving subscriber device numbers between test lists 824.

According to one embodiment, call control application 814 provides the subscriber device number and test list parameters to caller application 816. Caller application 816 is a system component responsible for processing the call instructions and making a test call to a subscriber device number. In one embodiment, caller application 816 provides the subscriber device number to signaler application 818, which is the system component that provides a means for generating the test call. Signaler application 818 may include a software program or module that interacts with the interface that connects the system 800 to devices (e.g., call agent, media gateways, session border controller) in the network to be tested in order to direct the test call to the proper subscriber. In one embodiment, signaler application 818 communicates with media gateway via a signaling network and/or a TDM or packet voice network. Once a test call is generated by signaler application 818, the test call is received over voice trunks by media gateway, which then directs the test call to a device associated with the intended subscriber number via transport network 802. In one embodiment, the media gateway may include a softswitch, media gateway controller, or any other network element capable of converting telecommunications protocols. The media gateway is a network device that has one or more interfaces connecting transport network 802 to test call system 800, media gateway may also be positioned within transport network 802 in alternate embodiments. Media gateway will communicate with a call agent 820, which is responsible for processing call requests and setting up calls between media gateway and test call system 800.

Once processed by the media gateway, the test call traverses transport network 802 and received by one of the subscriber devices 804-810. Subscriber devices 804-810 may include multimedia terminal adapters, analog telephony adapters, cable modems, or any like component (e.g., ADSL/ SDSL/VDSL modem, fiber modem or ONT, ATM modem, wireless modem, etc.) used to connect telecommunications devices to a digital telephone system. Although only four subscriber endpoint devices are depicted in FIG. 8, additional (or fewer) endpoint devices may be implemented without departing from the scope of the present subject matter. In one embodiment, the subscriber device is signaled to "loopback" the voice path so that the test call's voice path is returned to test call system 800. The type of loopback procedure performed will depend on the loopback type defined in the test call to the subscriber device. For example, if the subscriber device is an MTA, then the test call may comply with a cable network call signaling (NCS) loopback procedure. Similarly, if the subscriber device is an ATA, then the test call may comply with an RTP loopback procedure. During the loopback procedure, the voice trunk 818 has a wave file sent on the voice connection to the subscriber device 804-810 and the loopback in the device. In one embodiment, caller application 816 receives the wave file from the loopback at subscriber device and invokes a PESQ test function and subsequently logs the resulting PESQ score for the test call in test call result database 825. It is important to note that the test call is transparent to the subscriber. Notably, the test call does not ring the subscriber device and has no effect on the subscriber's service, thereby allowing test calls to be made at any time of the day. Another aspect of test call system 800 is the ability to transfer or move subscriber device numbers among test lists 824. In order to efficiently test the voice quality experienced by subscribers, the frequency of test calls must be adjusted by the telecommunications service provider in order to address various problems experienced by different subscribers. In one embodiment, test call system 800 performs this function by transferring and moving subscriber device numbers among test lists 824.

Call data such as test call data (e.g., PESQ data) and IP metrics (e.g., extracted from CDRs) may be stored in CDR and test call results database 825. Geographic information such as street addresses and GPS coordinates may be stored in geographic information database 832. Both of databases 825 and 832 may be connected to data combining and mapping module 834 which may combine CDR and test call data and geographic information in order to produce a map illustrating the locations of network devices and their call quality statuses. The map views may be displayed on user display 836 by different network operator users.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for combining voice over Internet protocol (VoIP) call data with geographical information, the method comprising:

determining VoIP subscriber device call quality information for a first subset of VoIP subscriber devices, wherein determining VoIP subscriber device call quality information includes remotely testing the first subset of the VoIP subscriber devices including performing one or more loopback test calls between a test call system and one of the first subset of the VoIP subscriber devices, wherein the test call system is separate from the VoIP subscriber devices;

determining VoIP subscriber device status information for the first subset of the VoIP subscriber devices;

obtaining geographic information regarding a geographic area in which the VoIP subscriber devices are deployed, wherein the geographic information includes locations of network equipment associated with the VoIP subscriber devices, wherein the network equipment includes a tap, an amplifier, a splice connector, a coax connector, a power supply, an optical cabling and distribution network device, an optical line terminal (OLT) unit, or an optical network terminal (ONT) unit;

combining the VoIP subscriber device status information with the geographic information;

based on the combined VoIP subscriber device status and the geographic information, graphically displaying, on a display device associated with a computer, a map that illustrates the geographic locations of the VoIP subscriber devices and the network equipment and illustrates an indication of the current status and the call quality of each of the first subset of the VoIP subscriber devices; and selecting a VoIP subscriber device for remote testing using the map based on common network equipment used by the selected VoIP device and a second subset of the VoIP subscriber devices, wherein the second subset includes one or more VoIP subscriber devices from the first subset experiencing a predetermined call quality or having a predetermined device status, wherein the selected VoIP subscriber device is distinct from the first subset and the second subset of the VoIP subscriber devices, wherein the common network equipment includes physical plant equipment.

2. The method of claim 1 wherein determining VoIP subscriber device call quality information includes one of: remotely testing the first subset of the VoIP subscriber devices and examining information associated with calls made or received by the first subset of the VoIP subscriber devices.

3. The method of claim 2 wherein remotely testing the first subset of VoIP subscriber devices includes automatically or manually initiating testing of the first subset of the VoIP subscriber devices.

4. The method of claim 2 wherein remotely testing the first subset of the VoIP subscriber devices includes initiating a test call from the map that illustrates the geographic locations of the first subset of the VoIP subscriber devices.

5. The method of claim 2 wherein remotely testing the first subset of the VoIP subscriber devices includes automatically testing based on each VoIP subscriber's presence in one or more test schedule lists.

6. The method of claim 2 wherein determining VoIP subscriber device call quality information includes examining one or more of call detail records (CDRs) and IP metric records for the VoIP subscriber.

7. The method of claim 2 wherein determining VoIP subscriber device call quality information includes determining at least one of uplink jitter, uplink latency, uplink packet loss, downlink jitter, downlink latency, downlink packet loss, a total number of calls, a total number of test calls, a number of test call failures, and a call duration.

8. The method of claim 1 wherein determining VoIP subscriber device call quality information includes determining at least one of a perceptual evaluation of speech quality (PESQ) score, total number of calls, total number of test calls, number of test call failures, and test call duration.

9. The method of claim 1 wherein determining VoIP subscriber device status information includes determining whether the first subset of the VoIP subscriber devices is one of a normal state, a call quality concern state, and a test call failure state.

10. The method of claim 1 wherein determining VoIP subscriber device status information includes determining status information for one of a cable modem, a multimedia terminal adapter (MTA), an asynchronous digital subscriber link (ADSL) modem, a synchronous digital subscriber link (SDSL) modem, a fiber optic modem, an optical network terminal (ONT), an analog telephony adapter (ATA), a Soft-Phone, an IP private branch exchange (PBX), a VoIP mobile phone, a wireless phone incorporating an ATA, a wireless phone incorporating an MTA, a wireline phone incorporating an ATA, a wireline phone incorporating an MTA, and a wireless modem.

11. The method of claim 1 wherein obtaining geographic information includes obtaining at least one of global positioning system (GPS) coordinates, a longitude, a latitude, an altitude, a street address, and a relationship to a known fixed position.

12. The method of claim 1 wherein graphically displaying a map that illustrates the geographic locations of the VoIP subscriber devices and an indication of the current status of each VoIP subscriber device includes displaying one of a topological map, a topographical map, a 2-dimensional map, a 3-dimensional map, a street map, a satellite map, or a combination thereof.

13. A system for combining voice over Internet protocol (VoIP) call data with geographical information, the system comprising:
  a call quality statistics database for storing VoIP subscriber device call quality information and VoIP subscriber device status information for a first subset of the VoIP subscriber devices, wherein the system is configured to determining VoIP subscriber device call quality information by remotely testing the first subset of the VoIP subscriber devices including performing one or more loopback test calls between a test call system and one of the first subset of the VoIP subscriber devices, wherein the test call system is separate from the VoIP subscriber devices;
  a geographic information database for storing geographic information regarding a geographic area in which the VoIP subscriber devices are deployed, wherein the geographic information includes locations of network equipment associated with the VoIP subscriber devices, wherein the network equipment includes a tap, an amplifier, a splice connector, a coax connector, a power supply, an optical cabling and distribution network device, an optical line terminal (OLT) unit, or an optical network terminal (ONT) unit;
  a data combining and mapping module for combining the VoIP subscriber device status information with the geographic information and, based on the combined VoIP subscriber device status and the geographic information, generating a map that illustrates the geographic locations of the VoIP subscriber devices and the network equipment and illustrates an indication of the current status and the call quality of each of the first subset of the VoIP subscriber devices; and
  a display device associated with a computer for graphically displaying the map, wherein the computer or a user selects a VoIP subscriber device for remote testing using the map based on common network equipment used by the selected VoIP device and a second subset of the VoIP subscriber devices, wherein the second subset includes one or more VoIP subscriber devices from the first subset experiencing a predetermined call quality or having a predetermined device status, wherein the selected VoIP subscriber device is distinct from the first subset and the second subset of the VoIP subscriber devices, wherein the common network equipment includes physical plant equipment.

14. The system of claim 13 wherein the VoIP subscriber devices includes at least one of a cable modem, a multimedia terminal adapter (MTA), an asynchronous digital subscriber link (ADSL) modem, a synchronous digital subscriber link (SDSL) modem, a fiber optic modem, an optical network terminal (ONT), an analog telephony adapter (ATA), a Soft-Phone, an IP private branch exchange (PBX), a VoIP mobile phone, a wireless phone incorporating an ATA, a wireless phone incorporating an MTA, a wireline phone incorporating an ATA, a wireline phone incorporating an MTA, and a wireless modem.

15. The system of claim 13 wherein the data combining and mapping module is configured to determine a perceptual evaluation of speech quality (PESQ) score.

16. The system of claim 13 wherein the data combining and mapping module is configured to automatically or manually initiate testing of the first subset of the VoIP subscriber devices.

17. The system of claim 13 wherein the data combining and mapping module is configured to initiate a test call from the map that illustrates the geographic locations of the first subset of the VoIP subscriber devices.

18. The system of claim 13 wherein the data combining and mapping module is configured to automatically test the first subset of the VoIP subscribers based on each VoIP subscriber's presence in one or more test schedule lists.

19. The system of claim 13 wherein the data combining and mapping module is configured to determine whether the first subset of the VoIP subscriber devices is associated with one of a normal state, a call detail record (CDR) quality concern state, and a routine test call failure state.

20. The system of claim 13 wherein the data combining and mapping module is configured to determine at least one of uplink jitter, uplink latency, uplink packet loss, downlink jitter, downlink latency, downlink packet loss, a total number of calls, a total number of test calls, a number of test call failures, and a call duration.

21. The system of claim 13 wherein the geographic information database stores global positioning system (GPS) coordinates.

22. The system of claim 13 wherein the data combining and mapping module is configured to generate one of a topological map, a topographical map, a 2 dimensional map, a 3-dimensional map, a street map, a satellite map, or a combination thereof.

23. The system of claim 13 wherein the display device displays one of a topological map, a topographical map, a 2-dimensional map, a 3-dimensional map, a street map, a satellite map, or a combination thereof.

24. A non-transitory computer readable medium having stored thereon executable instructions that when executed by a processor of a computer control the computer to perform steps comprising:
  determining VoIP subscriber device call quality information for a first subset of VoIP subscriber devices, wherein determining VoIP subscriber device call quality information includes remotely testing the first subset of the VoIP subscriber devices including performing one or more loopback test calls between a test call system and one of the first subset of the VoIP subscriber devices, wherein the test call system is separate from the VoIP subscriber devices;

determining VoIP subscriber device status information for the first subset of the VoIP subscriber devices;

obtaining geographic information regarding a geographic area in which the VoIP subscriber devices are deployed, wherein the geographic information includes locations of network equipment associated with the VoIP subscriber devices, wherein the network equipment includes a tap, an amplifier, a splice connector, a coax connector, a power supply, an optical cabling and distribution network device, an optical line terminal (OLT) unit, or an optical network terminal (ONT) unit;

combining the VoIP subscriber device status information with the geographic information;

based on the combined VoIP subscriber device status and the geographic information, graphically displaying, on a display device associated with a computer, a map that illustrates the geographic locations of the VoIP subscriber devices and the network equipment and illustrates an indication of the current status and the call quality of each of the first subset of the VoIP subscriber devices; and selecting a VoIP subscriber device for remote testing using the map based on common network equipment used by the selected VoIP device and a second subset of the VoIP subscriber devices, wherein the second subset includes one or more VoIP subscriber devices from the first subset experiencing a predetermined call quality or having a predetermined device status, wherein the selected VoIP subscriber device is distinct from the first subset and the second subset of the VoIP subscriber devices, wherein the common network equipment includes physical plant equipment.

* * * * *